(12) United States Patent
Blevins et al.

(10) Patent No.: US 7,844,636 B2
(45) Date of Patent: *Nov. 30, 2010

(54) SYSTEMS AND METHODS FOR CLIENT-SIDE FILTERING OF SUBSCRIBED MESSAGES

(75) Inventors: Michael Blevins, Volcano, CA (US); John C. Shafer, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/932,176

(22) Filed: Oct. 31, 2007

(65) Prior Publication Data

US 2008/0059597 A1 Mar. 6, 2008

Related U.S. Application Data

(63) Continuation of application No. 10/785,701, filed on Feb. 24, 2004, now Pat. No. 7,293,038.

(60) Provisional application No. 60/450,061, filed on Feb. 25, 2003.

(51) Int. Cl.
G06F 7/00 (2006.01)
G06F 15/16 (2006.01)
(52) U.S. Cl. .................. 707/799; 709/203; 709/206; 709/207
(58) Field of Classification Search ............ 709/207, 709/203, 206; 707/2, 799
See application file for complete search history.

(56) References Cited

U.S. PATENT DOCUMENTS 5,321,841 A 6/1994 East et al.
5,469,562 A 11/1995 Saether (Continued)

FOREIGN PATENT DOCUMENTS

CA 2248634 3/2000

(Continued)

OTHER PUBLICATIONS

Gibbone, "RosettaNet: Teaching Business to Work Together", Oct. 1, 1999. Retrieved from http://www.developer.com/xml/article.php/616641.

(Continued)

*Primary Examiner*—Apu M Mofiz
*Assistant Examiner*—Cindy Nguyen
(74) *Attorney, Agent, or Firm*—Fliesler Meyer LLP

(57) ABSTRACT

A message broker can allow any server in a cluster to publish to, and subscribe, to a message channel. A server subscribing to a channel can set up a message filter such that XQuery expressions can be used to filter against the messages arriving on the channel A message broker can also utilize a unique filtering algorithm to optimize data access. Static subscription information can be captured in order for a message broker to do client-side filtering. A message broker can also construct and maintain at least one table in memory that indicates whether any server in the cluster may ever do a dynamic subscription. For dynamic subscriptions, the publishing server can extract the information from a database, such as by executing a DBMS select on a subscription table using a primary key lookup.

14 Claims, 14 Drawing Sheets

U.S. PATENT DOCUMENTS

| | | |
|---|---|---|
| 5,604,860 A | 2/1997 | McLaughlin et al. |
| 5,630,131 A | 5/1997 | Palevich et al. |
| 5,748,975 A | 5/1998 | Van De Vanter |
| 5,801,958 A | 9/1998 | Dangelo et al. |
| 5,835,769 A | 11/1998 | Jervis et al. |
| 5,836,014 A | 11/1998 | Faiman, Jr. |
| 5,867,822 A | 2/1999 | Sankar |
| 5,944,794 A | 8/1999 | Okamoto et al. |
| 5,961,593 A | 10/1999 | Gabber et al. |
| 5,966,535 A | 10/1999 | Bendikt et al. |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,028,997 A | 2/2000 | Leymann et al. |
| 6,029,000 A | 2/2000 | Woolsey et al. |
| 6,044,217 A | 3/2000 | Brealey et al. |
| 6,067,623 A | 5/2000 | Blakley, III et al. |
| 6,070,184 A | 5/2000 | Blount et al. |
| 6,092,102 A | 7/2000 | Wagner |
| 6,119,149 A | 9/2000 | Notani |
| 6,141,701 A | 10/2000 | Whitney |
| 6,148,336 A | 11/2000 | Thomas et al. |
| 6,185,734 B1 | 2/2001 | Saboff et al. |
| 6,212,546 B1 | 4/2001 | Starkovich et al. |
| 6,222,533 B1 | 4/2001 | Notani et al. |
| 6,226,675 B1 | 5/2001 | Meltzer et al. |
| 6,230,287 B1 | 5/2001 | Pinard et al. |
| 6,230,309 B1 | 5/2001 | Turner et al. |
| 6,237,135 B1 | 5/2001 | Timbol |
| 6,243,737 B1 | 6/2001 | Flanagan et al. |
| 6,292,932 B1 | 9/2001 | Baisley et al. |
| 6,311,327 B1 | 10/2001 | O'Brien et al. |
| 6,330,569 B1 | 12/2001 | Baisley et al. |
| 6,334,114 B1 | 12/2001 | Jacobs et al. |
| 6,338,064 B1 | 1/2002 | Ault et al. |
| 6,343,265 B1 | 1/2002 | Glebov et al. |
| 6,353,923 B1 | 3/2002 | Bogle et al. |
| 6,360,358 B1 | 3/2002 | Elsbree et al. |
| 6,367,068 B1 | 4/2002 | Vaidyanathan et al. |
| 6,377,939 B1 | 4/2002 | Young |
| 6,408,311 B1 | 6/2002 | Baisley et al. |
| 6,411,698 B1 | 6/2002 | Bauer et al. |
| 6,442,565 B1 | 8/2002 | Tyra et al. |
| 6,445,711 B1 | 9/2002 | Scheel et al. |
| 6,470,364 B1 | 10/2002 | Prinzing |
| 6,516,322 B1 | 2/2003 | Meredith |
| 6,560,636 B2 | 5/2003 | Cohen et al. |
| 6,560,769 B1 | 5/2003 | Moore et al. |
| 6,567,738 B2 | 5/2003 | Gopp et al. |
| 6,584,454 B1 | 6/2003 | Hummel et al. |
| 6,594,693 B1 | 7/2003 | Borwankar |
| 6,594,700 B1 | 7/2003 | Graham et al. |
| 6,601,113 B1 | 7/2003 | Koistinen et al. |
| 6,604,198 B1 | 8/2003 | Beckman et al. |
| 6,609,115 B1 | 8/2003 | Mehring et al. |
| 6,615,258 B1 | 9/2003 | Barry et al. |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,662,357 B1 | 12/2003 | Bowman-Amuah |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 | 9/2004 | Evans et al. |
| 6,799,718 B2 | 10/2004 | Chan et al. |
| 6,802,000 B1 | 10/2004 | Greene et al. |
| 6,804,686 B1 | 10/2004 | Stone et al. |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,950,872 B2 | 9/2005 | Todd, II |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 7,000,219 B2 | 2/2006 | Barrett et al. |
| 7,017,146 B2 | 3/2006 | Dellarocas et al. |
| 7,043,722 B2 | 5/2006 | Bau, III |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,568 B2 | 8/2006 | Yoshida et al. |
| 7,089,584 B1 | 8/2006 | Sharma |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,155,705 B1 | 12/2006 | Hershberg et al. |
| 7,184,967 B1 | 2/2007 | Mital et al. |
| 7,240,331 B2 | 7/2007 | Vion-Dury et al. |
| 7,260,599 B2 | 8/2007 | Bauch et al. |
| 7,260,818 B1 | 8/2007 | Iterum et al. |
| 7,516,440 B2 * | 4/2009 | Upton ........................ 717/106 |
| 2001/0037358 A1 * | 11/2001 | Clubb et al. ................. 709/203 |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016775 A1 | 2/2002 | Nakagawa |
| 2002/0049788 A1 | 4/2002 | Lipkin et al. |
| 2002/0073396 A1 | 6/2002 | Crupi et al. |
| 2002/0083075 A1 | 6/2002 | Brummel et al. |
| 2002/0111922 A1 | 8/2002 | Young et al. |
| 2002/0120685 A1 | 8/2002 | Srivastava et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0174178 A1 | 11/2002 | Stawikowski |
| 2002/0174241 A1 | 11/2002 | Beged-Dov et al. |
| 2002/0184610 A1 | 12/2002 | Chong et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |

| | | | |
|---|---|---|---|
| 2003/0018832 A1 | 1/2003 | Amirisetty et al. |
| 2003/0023957 A1 | 1/2003 | Bau et al. |
| 2003/0028364 A1 | 2/2003 | Chan et al. |
| 2003/0028579 A1 | 2/2003 | Kulkarni et al. |
| 2003/0041198 A1 | 2/2003 | Exton et al. |
| 2003/0043191 A1 | 3/2003 | Tinsley et al. |
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0079029 A1 | 4/2003 | Garimella et al. |
| 2003/0110117 A1 | 6/2003 | Saidenbereg et al. |
| 2003/0110446 A1 | 6/2003 | Nemer |
| 2003/0126136 A1 | 7/2003 | Omoigui |
| 2003/0135556 A1 | 7/2003 | Holdsworth |
| 2003/0149791 A1 | 8/2003 | Kane et al. |
| 2003/0167358 A1 | 9/2003 | Marvin et al. |
| 2003/0196168 A1 | 10/2003 | Hu |
| 2004/0019645 A1 | 1/2004 | Goodman et al. |
| 2004/0040011 A1 | 2/2004 | Bosworth et al. |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0278585 A1 | 12/2005 | Spencer |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| WO | WO 9923558 | 5/1999 |
| WO | WO 0029924 | 5/2000 |

OTHER PUBLICATIONS

Kunisetty, "Workflow Modeling and Simulation Using an Extensible Object-Oriented Knowledge Base Management System" CiteSeer, 1996, pp. 1-60.

Blake, "Rule-Driven Coordination Agents: A Self-Configurable Agent Architecture for Distributed Control" IEEE, Mar. 2001; pp. 271-277.

Dahalin et al., "Workflow Interoperability Using Extensible Markup Language (XML)" IEEE, Jul. 2002; pp. 513-516.

Liebmann et al., "Adaptive Data Dissemination and Caching for Edge Service Architectures built with the J2EE", Mar. 2004, ACM Press, 2004 ACM Symposium on Applied Computing, pp. 1717-1724.

Sosnoski, XML and Java technologies: Data binding, Part 1: Code generation approaches—JAXB and more, IBM, pp. 1-11, 01 2003.

Chen et al., "eCo Architecture for Electronic Commerce Interoperability", Jun. 29, 1999, CommerceNet, Part 1 of document, pp. 1-54.

JAVA Debug Interface—definition, retrieved from <URL http://java.sun.com/j2se/1.4.2/docs/guide/jpda/jdi/overview-summary.html> on Feb. 21, 2007, pp. 1-3.

HP, "HP Application Server Developer's Guide," Version 8.0, Hewlett-Packard Company, 1999-2001, pp. 27-81, 127-160, 195-271.

Tang, et al., "Integrating Remote Invocation and Distributed Shared State," Proceedings of the 18th International Parallel and Distributed Processing Symposium, (IPDPS '04), Apr. 26-30, 2004, 10 pages.

Mays, et al., "A Persistent Store for Large Shared Knowledge Bases," IEEE Transactions on Knowledge and Data Engineering, vol. 3, No. 1, Mar. 1991, pp. 33-41.

Embury, et al., "Assisting the Comprehension of Legacy Transactions," Proceedings of the Eighth Working Conference on Reverse Engineering, IEEE, Oct. 2-5, 2001, pp. 345-354.

Kilgore, "Multi-Language, Open-Source Modeling Using the Microsoft .NET Architecture," Proceedings of the 2002 Winter Simulation Conference, Dec. 8-11. 2002, pp. 629-633, IEEE, vol. 1.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Mohan et al., "ARIES: A Transaction Recovery Method Supporting Fine-Granularity Locking and Partial Rollbacks Using Write-Ahead Logging", ACM Transactions on Database Systems (TODS), Mar. 1992, pp. 94-162, vol. 17, Issue 1.

BEA Systems, Inc., "Transforming Data Using Xquery Mapper", BEA AquaLogic Service Bus 2.0 Documentation, 2006, 19 pages.

Stylus Studio, "Xquery Mapper", 2007, 6 pages, Stylus Studios.

Altova, "XML-to-XML Mapping", MapForce, 2007, 3 pages.

Jamper, "Java XML Mapper", Sourceforge, 2007, 4 pages.

Sharma, "J2EE Connector Architecture Specification, Version 1.0 Final Release", Java 2 Enterprise Edition, Aug. 2001, 90 pages, Sun Microsystems.

Allamaraju, et al., "Professional Java Server Programming J2EE 1.3 Edition", Sep. 2001, pp. 1009-1057, WROX.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML Transducers in Java", May 2002, The Eleventh International World Wide Conference, retrieved from: http://www2002.org/CDROM/poster/132/index.html., 6 pages.

Supplementary European Search Report for EP 02784131.1 dated Aug. 8, 2007, 4 pages.

Microsoft, "Microsoft.net Framework", Microsoft Corporation, 2001, 54 pages.

Willink, "Meta-Compilation for C ++", University of Surrey, Jan. 4, 2000, 379 pages.

Chung, "Publish-Subscribe Toolkit Documentation for Microsoft BizTalk Server 2002", May 2002, Microsoft Corporation, 18 pages.

"Selecting XML with SQuery and XPath", 5 pages.

* cited by examiner

- Prior Art -

- Prior Art -

*MessageBroker*
```
/**
 * Represents the Message Broker itself
 */
public class MessageBroker {
    /**
     * Method used to dispatch (or publish) messages to
     * subscribers registered with the Message Broker.
     */
    public void dispatch(Message msg);
    // [TODO: add subscription and filter management APIs]
}
```

*Message*
```
/**
 * Represents an incoming message in the Message Broker system
 */
public class Message {
    private String topic;
    private XML envelope;
    private XML[] messagePart;
}
```

*Filter*
```
/**
 * Represents a filter in the Message Broker
 */
public class Filter {
    private String name;
    private String expression;

/**
     * Evaluates the filter expression and returns the resulting
     * filter value for this message.  Returns null if the filter
     * is not satisfied.
     */
    public Object evaluate(Message msg);
}
```

*SubscriptionRule*
```
/**
 * Represents a subscription rule in the Message Broker
 */
public class SubscriptionRule {
    private String name;
    private boolean isDynamic;
    private String messageTopic;
    private String filterName;
    private String filterValue;
    private ISubscriber subscriber;
}
```

*ISubscriber*
```
/**
 * Interface that all Message Broker subscriber objects must implement
 */
public interface ISubscriber {
    void dispatch(Message msg);
    void dispatch(Message msg, String subscriberInstance);
}
```

*Figure 6*

```
public interface MessageBrokerControl extends Control {
    // next methods match the methods on service controls
    public String getConversationID();
    public Element[] getInputHeaders();
    public void setOutputHeaders( Element headers[] );

/**
     * stop receiving subscribed events
     */
    public void unsubscribe();

/**
     * subscribe to filtered topics
     * @param filterValueMatch Match this against the xquery (xquery
     * attribute must be present)
     */
    public void subscribeToFilteredTopics( String filterValueMatch );

/**
     * subscribe to unfiltered topics - (xquery attribute must not
     * be present)
     */
    public void subscribeToUnfilteredTopics();

/**
     * publish an XML var to a topic
     * @param topicName Name of topic to publish to
     * @param msg Message to publish
     */
    void publishXML( String topicName, XML msg );

/**
     * publish an Binary var to a topic
     * @param topicName Name of topic to publish to
     * @param msg Message to publish
     */
    void publishBinary( String topicName, Binary msg );

public interface Callback {
      /**
       * Receive an XML message from the specified topic
       * (specified in the annotation)
       * @param msg Message to receive
       */
      public void onXMLMessage( XML msg );

/**
       * Receive an Binary message from the specified topic
       * (specified in the annotation)
       * @param msg Message to receive
       */
      public void onBinaryMsg( Binary msg );
    }

```
/**
 * @jws:flow flow::
 *   <process>
 *       <receive name="getInputMsg" method="getInputMsg"/>
 *       <perform name="getOrderNumber" method="getOrderNumber"/>
 *       <send name="sendOrderMsg" method="sendOrderMsg"/>
 *   </process>
 *   ::
 */
public class publisher {

XML inputMsg = null;

String orderNumber = null;

/** @jws:control's */
    // not shown - transform control with "getit" method
    // Grouping Workflow
    MyServiceControl myServiceControl;

/**
     * @jws:operation
     * @jws:message-buffer enable="false"
     */
    public void getInputMsg(XML inputMsg) {
        this.inputMsg = inputMsg;
    }

/**
     * @jws:local-operation
     */
    public void getOrderNumber() {
        orderNumber = myTransformControl.getit (inputMsg );
    }

/**
     * @jws:send-operation
     */
    public void sendOrderMsg() { myServiceControl.setConversationId( orderNumber );
        myServiceControl.processOrderMsg(outputReconXMLMsg)
    }
}
```

*Figure 14*

```
/**
 * @jws:flow flow::
 *    <process name="process1">
 *      <receive name="getInputMsg" method="getInputMsg"/>
 *        <perform method="processInputMessage"/>
 *        <whileDo condition="!foundTerminator">
 *           <choice>
 *              <onMessage method="getInputMessage"/>
 *                 <perform method="processInputMessage"/>
 *              </onMessage>
 *              <onTimeout>
 *                 <perform name="buildDigest"/>
 *                 <send name="callManualWorkflow"/>
 *                 <finish/>
 *              </onTimeout>
 *           </choice>
 *        </whileDo>
 *        <perform name="buildDigest"/>
 *        <send name="sendDigest"/>
 *    </process>
 */
public class subscriber {
    transient XML orderDigest = null;
    transient XML lastInputMsg = null;
    transient Boolean foundTerminator = false;
    TreeMap orderList = new TreeMap();

/* missing: xquery annotation  for checkDone, findSequence and
       wrapDigest */
    Xqueries xtc;

/** @jws:control's */
    // Processing workflows
    AutomatedProcessor automatedProcessor;
    ManualProcessor manualProcessor;

/**
     * @jws:operation
     * @jws:conversation phase="default"
     * @jws:message-buffer enable="true"
     */
    public void getInputMessage(XML inputMsg) {
        this.lastInputMsg = inputMsg;
    }

/**
     * @jws:local-operation
     */
    public void processMessage() {
        foundTerminator = xtc.checkDone(lastInputMessage);
        if (!foundTerminator) {
            String seqnum = xtc.findVersion(lastInputMessage);
            orderList.put( seqnum, lastInputMessage );
        }
    }
```

*Figure 15*

… # SYSTEMS AND METHODS FOR CLIENT-SIDE FILTERING OF SUBSCRIBED MESSAGES

CLAIM OF PRIORITY

This application is a continuation application of U.S. patent application Ser. No. 10/785,701, filed on Feb. 24, 2004 and issued on Nov. 6, 2007 as U.S. Pat. No. 7,293,038, entitled "Systems and Methods for Client -Side Filtering of Subscribed Messages", by Mike Blevins, et al., which claims priority to U.S. Patent Provisional Application 60/450,061 entitled "Systems and Methods for Client-side Filtering of Subscribed Messages", by Mike Blevins, et al., filed Feb. 25, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the filtering of messages in a subscription-based messaging model.

BACKGROUND

Many systems exist that allow for messaging between servers in a cluster. These systems often follow a publish/subscribe approach to messaging. Using such an approach, servers in a cluster can choose to "subscribe" to a particular topic, or type of message, such that the server receives any message on that topic or of that type. When a server has a message to be sent to "subscribers," the server will "publish" the message, or send a copy of the message to each server in the cluster. Each server receiving the message has a set of filters or rules that will determine whether or not that server has subscribed to receive that type of message. If the server has not subscribed to the topic for that particular message, the message is simply discarded. If the server has subscribed to that topic, the message can be bumped up to the application code on that server. This approach is not an efficient use of resources, however, as many messages are sent that are ultimately discarded.

BRIEF SUMMARY

Systems and methods in accordance with the present invention overcome deficiencies in existing messaging systems by taking advantage of client-side filtering. Using a component such as a message broker to filter messages before they are published to subscribers can reduce the amount of filtering and can reduce the amount of message traffic throughout a server cluster, for example.

Other features, aspects, and objects of the invention can be obtained from a review of the specification, the figures, and the claims.

BRIEF DESCRIPTION OF THE DRAWINGS

FIG. 6 is a code example showing exemplary message broker-related Java classes and associated methods that can be used with the system of FIG. 4.

FIG. 8 is a code example showing an exemplary message broker control.

FIG. 14 is a code example for an exemplary routing workflow.

FIG. 15 is a code example for an exemplary subscriber workflow.

DETAILED DESCRIPTION

Figure 1:
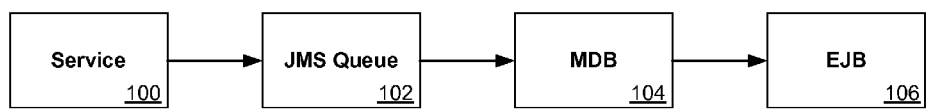
FIG. 1 is a diagram of a publication model of the prior art.

Systems and methods in accordance with the present invention can overcome deficiencies in existing messaging systems by taking advantage of a messaging component or control referred to herein as a message broker (MB). As with many existing systems, a message broker follows a publish and subscribe messaging approach. Many Java messaging service (JMS) implementations follow this approach, where someone publishes a message to which a number of people can subscribe.

A message broker can operate in a homogeneous server cluster. The message broker can allow any server in that cluster to publish to and subscribe to a channel, which is somewhat analogous to a topic in earlier messaging systems. A server subscribing to a channel can set up a message filter such that XQuery expressions can be used to filter against the messages arriving on the channel. XQuery is a standard query language for processing XML data and data whose structure is similar to XML. A user can write or create an XQuery expression that can extract a portion of the (XML) document payload. The server can then compare the extracted fragment against a filter value for that channel, and if the XML fragment matches the filter value then the server receives the message.

A message broker can also utilize a unique filtering algorithm to optimize data access. For example, some subscriptions can said to be "static" subscriptions", in that the subscription information will never change. The static subscription information can be captured in order for a message broker to do what is referred to herein as client-side filtering. A "client" in this case refers to a role in the cluster, as the server attempting to publish a message to the cluster is referred to as the client for that publish operation. As discussed previously, existing systems do what is referred to as server-side filtering, where a "server" is the role of any cluster server receiving a message.

A message broker can construct and maintain at least one table in memory that indicates whether any server in the cluster may ever do a dynamic subscription, or a non-static subscription. If all servers in a cluster are doing exclusively static subscriptions, then a message broker may never need to access a database for subscription information, as all the information can simply be cached in resident memory. A static subscriber can have registered for messages at subscriber deployment time, while a dynamic subscriber can register for messages at runtime, and may potentially register quite frequently. If any server in the cluster is capable of doing a dynamic subscription, that information can be difficult to cache as it can change at any time and it is then necessary to ensure that all cached instances have the same information, that the information is current, and that each instance is notified whenever the dynamic subscription information changes. For dynamic subscriptions, then, the publishing server can extract the information from a database, such as by executing a DBMS select on a subscription table using a primary key lookup. This filtering approach can be much more efficient that filter matching using binary filters.

Figure 2:
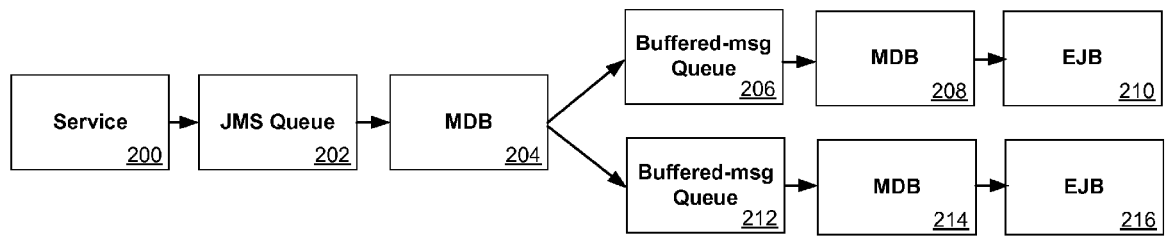
FIG. 2 is a diagram of another publication model of the prior art.
Figure 3:
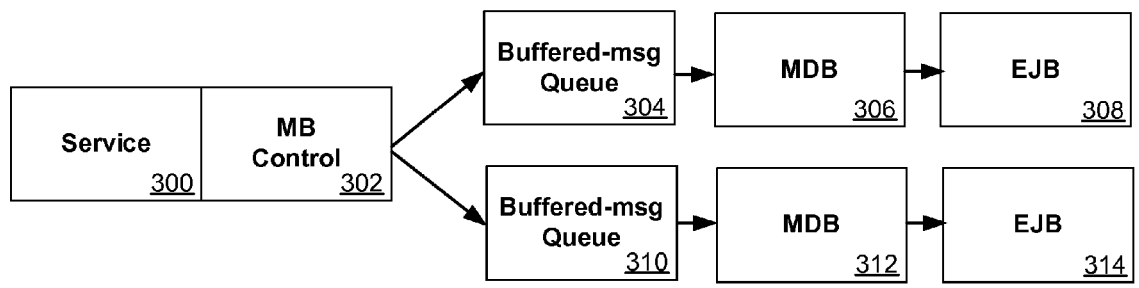
FIG. 3 is a diagram of a publication model that can be used in accordance with one embodiment of the present invention.

An example of different publication methods is shown in FIGS. 1, 2 and 3. FIG. 1 shows a prior art system with a JMS control queue 102 for a service 100 publishing through a message-driven bean 104 to an enterprise Java bean (ELB) 106. Existing systems use simple binary filters, which have only a yes/no expression for whether a server has subscribed to a message. As shown in FIG. 2, this is acceptable as each server receiving a message decides whether or not it has subscribed to the topic once the message is received. An MDB 204 takes a message on a JMS topic 202 for a service 200 and publishes the message to a message queue 206, 212 on each server. In this case, filtering has to be done for each server, as each server receives the message whether or not that server subscribed to the topic. This results in double sending and/or queuing of the message. Using a message broker 302 as shown in FIG. 3, the message broker first extracts a fragment from the message and then matches that fragment against a subscription value for each server. This not only allows the message broker to detect that these two expressions are the same, but enables the system to only have to apply the filter once. Each client is populated with the rules for clustering, as the cluster is homogenous, so the client can simply be a piece of software on the cluster. Filter expressions and the subscribers can be used to specify the filter rules. This results in an efficient filtering system, as the number of comparisons is significantly reduced, as well as the amount of message traffic throughout the cluster.

Systems and methods in accordance with one embodiment of the present invention can utilize the internal architecture and runtime of a message broker to manage subscriptions, apply filters, and route messages. Message broker components, such as a message broker control and a JMS connector, can be clients of the APIs discussed herein.

Figure 4:
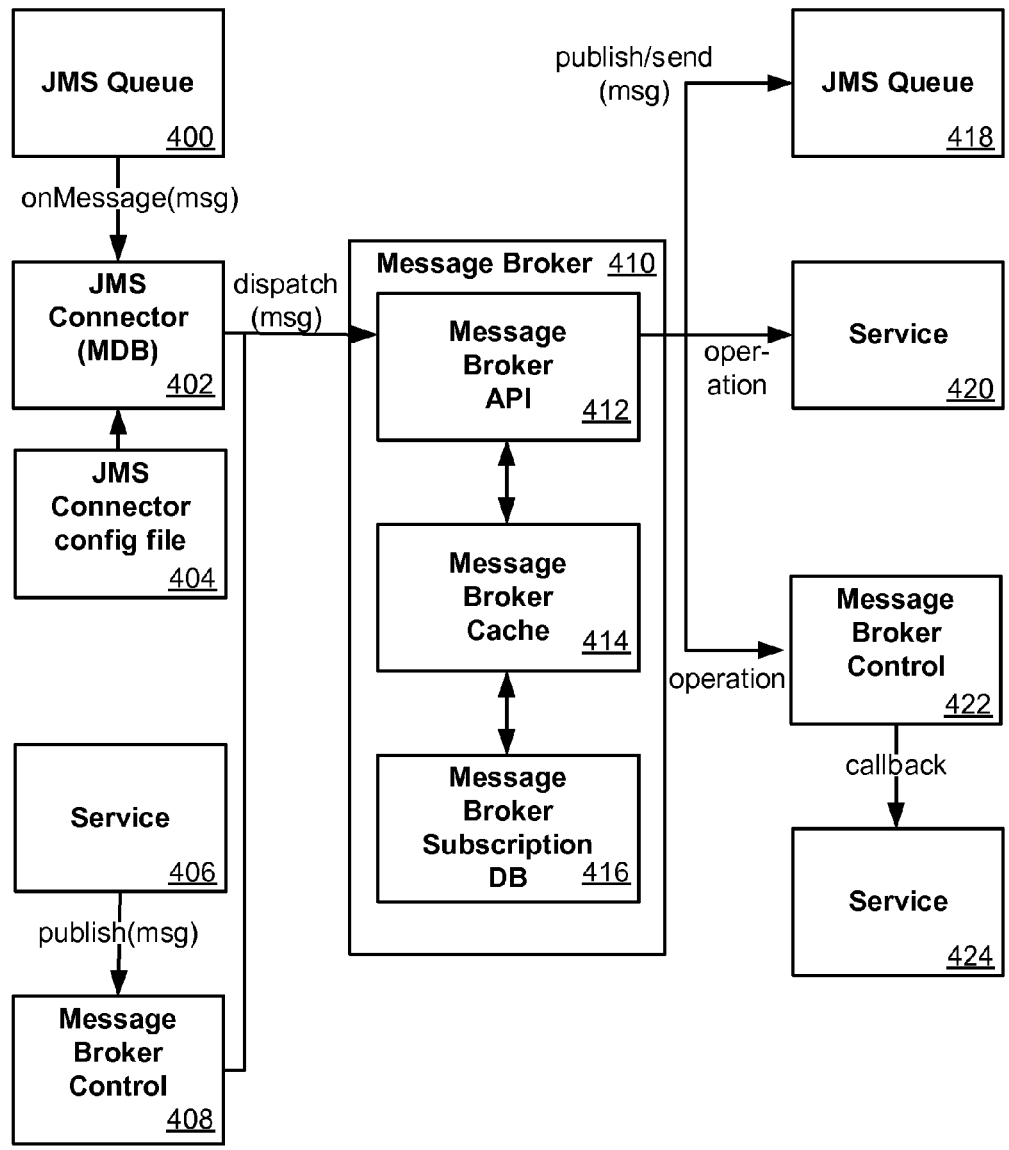
FIG. 4 is a diagram of a message broker system that can be used in accordance with one embodiment of the present invention.

FIG. 4 is a diagram of a message broker system that can be used in accordance with one embodiment of the present invention. Messages can enter the system via a message broker control 408 or a JMS Connector 402. Similar connectors or event generators for other sources such as e-mail sources can also be utilized. The message broker 410 can include the core filtering and routing pieces. The message broker logic can be hidden behind a Java API or message broker API 412, which can consult a subscription cache 414 and underlying subscription database 416 to determine routing for each message. Ultimately, messages can be delivered to a JMS queue 418 and/or a service 420, 424, either directly or via a callback from a message broker control 422.

A number of routing algorithms can be used for processing incoming messages. Messages delivered to a message broker for routing in one embodiment must have an assigned channel. It can be the responsibility of a message broker control or a JMS connector to assign a channel to each message.

One such algorithm is referred to as a message broker dispatch algorithm. In this dispatch algorithm, a message is received with an assigned message broker channel. All subscribers to the assigned channel that do not use a filter are identified. For subscriptions with filters, subscription information can be used to determine the distinct set of applicable filters based, at least in part, on the message channel. All applicable filters are evaluated, and the appropriate filter values obtained. Using the message broker channel, the set of satisfied filters, and the corresponding filter values, the matching subscribers can be located and added (distinctly) to those already collected. The message can then be dispatched to each subscriber. If no subscribers are found, the message can be sent to an error queue or a default subscriber.

A message broker can route incoming messages exactly once to each qualifying subscriber. This exactly-once guarantee does not extend to what the subscribers themselves may do with a message. A subscribing service could reroute the message back to the Message Broker for subsequent dispatch, presumably after performing some sort of transformation. A subscribing service could also directly route the message to other services that have already received the message from the message broker. A history property in the message envelope could be used to track and detect such scenarios.

A message broker can require a DBMS for persisting all filter and subscription data. Three database tables are required in one embodiment, including a filter table, a subscription rule table, and a dynamic subscriber table. Most of the active database querying and updating performed by the message broker can be restricted to the dynamic subscriber table.

A filter table can store filter expression information. To facilitate sharing and minimize the evaluation of duplicate filter expressions, filters can be referred to by name in message broker subscriptions. Subscribers using the same filter expression can refer to the same filter name, although this may not be guaranteed or enforced in each embodiment. For example, see Table 1.

TABLE 1

| Filter table | | | |
|---|---|---|---|
| Column Name | SQL Type | SQL Attributes | Description |
| FILTER_NAME | VARCHAR | Primary Key | Unique name for the filter, can be internally generated |
| EXPRESSION | VARCHAR | | Filter's XQuery expression |

Filter-table entries can consist of a filter name and a filter expression. A filter expression can be an XQuery, which can take advantage of an XQRL query engine and the fact that incoming messages can already be in the parsed and native binary format used by that engine. Validating filter expressions for things such as correct syntax and unbound variables can be the responsibility of development and/or deployment tools. Optionally, a field can be added here or in the cache structures to allow disabling filters whose expressions are determined at runtime to be invalid.

If filters are not named by users, these names can be generated automatically, such as by a deployment tool. This can include identifying identical filter expressions and using a common name in subscription registration. Users also may be able to independently define and name filters, which can later be referred to JWS annotations. The use of named filters also allows for possible expansion of the message filter itself. For example, if named transformations or XQuery controls are supported, this table can be expanded to allow the transformations/queries to be used as message broker filters.

A subscription rule table can store most of the information associated with an individual subscription. A subscription rule can associates a subscriber with a message channel and, optionally, a filter and filter value. For static subscribers, each entry can represent a complete subscription. For dynamic subscribers, each entry can define a subscription, but does not associate that subscription with a particular subscriber instance. In some sense, dynamic entries represent a subscription type declaration. Once a dynamic subscription rule is defined, that rule can later be associated with multiple individual subscriber instances at runtime. This instance information can be found, for example, in the dynamic subscriber table of Table 2.

cally refers to a field of variable-length binary data in a database. If the filter value is null but the filter name is not, the subscriber may only require that the filter be satisfied and does not care about the specific results of evaluating the filter. This can be done primarily for static subscriptions. For dynamic subscriptions, a null filter value can indicate that the filter value is not yet determined, and may be specified with each specific instance in the dynamic subscriber table shown, for example, in Table 3. This allows dynamic subscribers to share the same dynamic subscription rule, but subscribe to different filter values. Subscribing with a null filter value can be independent of other subscriptions using the same filter. It is entirely possible to have multiple subscriptions to the same filter, where some subscribers are looking for a particular filter value and others are only looking to satisfy a criterion, such as subscribing with a null value.

The serialized data in the SUBSCRIBER_DATA field can consist of most of the pieces needed to identify a subscriber. For JWS subscribers, this means the data needed to generate a JWS request in a dispatch architecture, such as the KNEX dispatch architecture (e.g. URI, method, control ID, etc.). For static subscriptions, this information can be complete. For dynamic subscriptions, a missing piece of data can be information identifying a specific subscriber instance. For JWS subscribers, that missing piece of information can be a con-

TABLE 2

Subscription Rule table

| Column Name | SQL Type | SQL Attributes | Description |
| --- | --- | --- | --- |
| RULE_NAME | VARCHAR | Primary Key | Unique name for the subscription rule, can be internally generated |
| IS_DYNAMIC | TINYINT | | Interpreted as a Boolean, a non-zero value can indicate a dynamic subscription rule as opposed to a static rule |
| TOPIC | VARCHAR | | Msg broker topic to which the rule is subscribing |
| FILTER_NAME | VARCHAR | Nullable | Name of an optional filter that the message must satisfy |
| FILTER_VALUE | VARCHAR | Nullable | Optional filter value that must match the results of the applying the rule's filter to the message |
| SUBSCRIBER_DATA | VARBINARY/ BLOB | | Serialized block of data that identifies the subscriber. For dynamic subscribers, an additional piece of data can be required to identify the subscriber instance |

Snippets of XML can be used to represent values in a column such as a FILTER_VALUE column. In many cases, the filter value will be simple, such as a string or number. More complex XML can still be allowed and handled appropriately. This field can be a BLOB of tokenized data to allow for more robust matching of XML fragments. A BLOB typiversation ID. Other types of subscribers not currently imagined can be handled in a similar fashion. For JWS subscribers, all of the needed subscriber information can be available implicitly or explicitly in a JWS source file. It can be automatically collected and registered with a message broker at deployment time.

TABLE 3

Dynamic Subscriber table

| Column Name | SQL Type | SQL Attributes | Description |
| --- | --- | --- | --- |
| RULE_NAME | VARCHAR | Primary Key | Name of a dynamic subscription rule |
| SUBSCRIBER_INSTANCE | VARCHAR | Primary Key | Identifies a particular subscriber instance |
| FILTER_VALUE | VARCHAR | Nullable | Optional filter value that must match the results of applying the rule's filter to the message |

A dynamic subscriber table, as shown in Table 3, can hold dynamic subscription instance information. Since this data is undergoing constant change as running instances register and unregister for dynamic subscriptions, it can be advantageous to store this data in a database instead of caching the data in a cluster. In order to expedite such a process, the table can be designed to contain minimal information such that as much data as possible can be stored in the more quickly-accessible cache memory. For each dynamic subscriber, the name of the instance can be stored, as well as the name of the dynamic subscription rule and the particular filter value (if any) being sought. Since a message broker can be repeatedly querying the dynamic subscriber table for instance names associated with a particular subscription rule and filter value, it can be essential in some embodiments that a multi-column index be created on columns such as RULE_NAME and FILTER_VALUE. A RULE_NAME column can be used to identify a subscription rule in the subscription rule table. This could be simplified even further to use integer-based rule IDs rather than names.

SUBSCRIBER_INSTANCE can contain information that identifies a particular subscriber instance. Combined with the SUBSCRIBER_DATA information in the referenced subscription rule, this can be sufficient information for dispatching messages to a specific dynamic subscriber instance. For JWS subscribers, SUBSCRIBER_INSTANCE can hold the JWS conversation-ID. FILTER_VALUE can override a null filter value in the referenced subscription rule. If all instances of a dynamic subscription use the same filter value, it can be more efficient to store the filter value once in the subscription rule and leave the value null in the individual dynamic subscription entries. This decision can be handled automatically, such as by the message broker control.

Caching

While all subscription data can reside in a DBMS, as much data as possible can be cached in memory for performance. Given the complexities of maintaining a consistent cache in a clustered environment, it can be desirable to only cache slow-changing or constant data. This can limit caching to the contents of tables such as the Filter and Subscription Rule tables. This data can be known at deployment time, and may not be affected by user code or running services. Updates to this cached data can still be allowed, but may be allowed only through a method such as via JMX-based APIs to ensure consistency across the cluster and with the underlying DBMS.

Caching may not be supported for tables such as the Dynamic Subscriber table, as such a table can be in a constant state of flux at runtime. In fact, subscriber instances may not even exist except during runtime, and their behavior in regards to subscribing and unsubscribing to the pre-defined subscription rules can be entirely runtime dependent. As such, DBMS access can be required for every query and update to data in a Dynamic Subscriber table.

Figure 5:
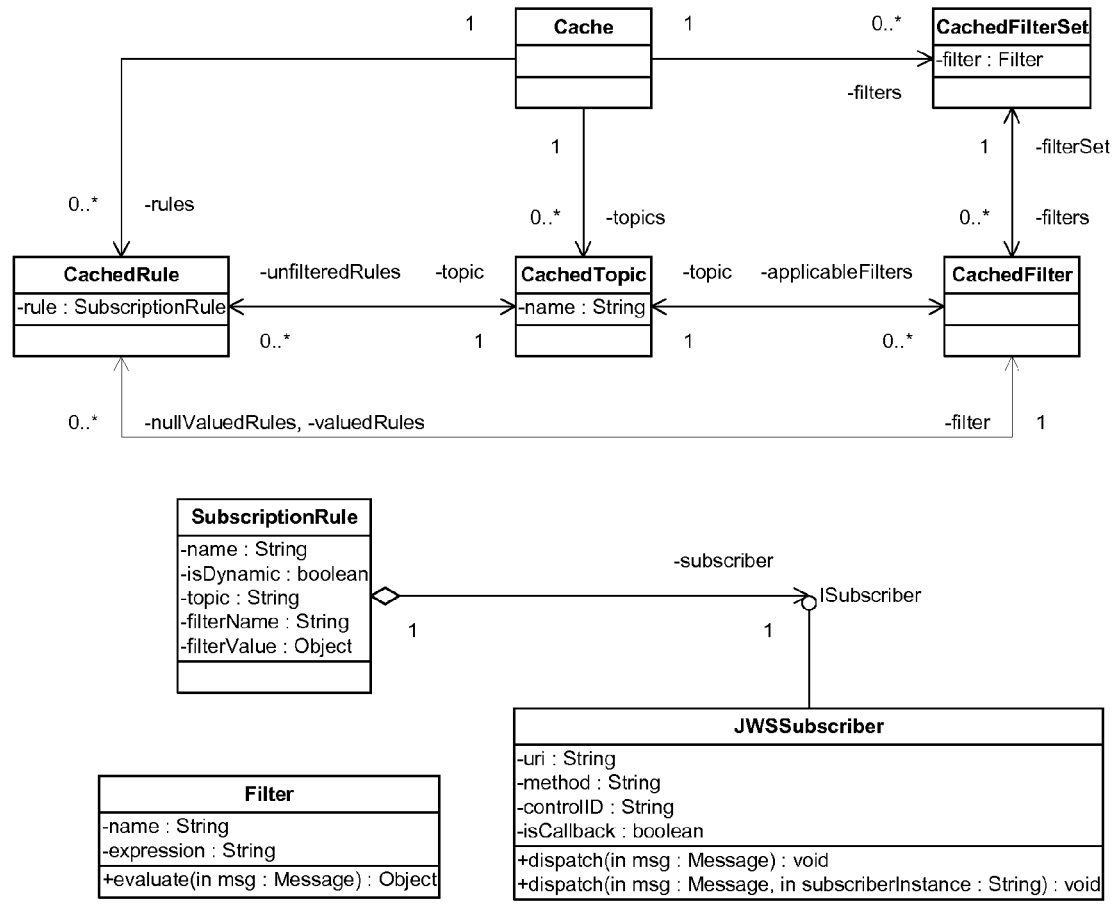
FIG. 5 shows an exemplary UML diagram showing some of the key objects that can be used by the message broker system of FIG. 4.

A cache used to store slowly-changing data, as well as the associated data structures, can be built from the DBMS data when a message broker first starts up. Subsequent updates via JMX can be applied to both the cache and the DBMS to ensure synchronous data storage at all times. FIG. 5 shows an exemplary UML diagram showing some of the key objects that can be used by the message broker system. Two such objects, Filter and SubscriptionRule, can directly represent entries in the underlying Filter and Subscription Rule database tables. Data from the SUBSCRIBER_DATA column of the Subscription Rule table can be converted, or deserialized, into an object that implements an ISubscriber interface. Such an interface can define at least two methods for dispatching messages to subscribers, including a method for dealing with static subscriptions that takes only a Message parameter, and a method dealing with dynamic subscriptions that requires the additional parameter of a subscriber instance string. The Dynamic Subscriber table can be queried to obtain this instance information. The use of such an interface can allow for arbitrary subscriber types in the message broker system, and can keep the details of subscriber information and subscriber dispatching well isolated.

In addition to these data structures, additional objects can be used to link channels, filters, and subscription rules within the cache. A Cache object, for example, can represent the cache itself. Each subscription rule can be represented in a cache by a CachedRule object. Message broker channels can also be directly represented in the cache by CachedChannel objects. Filter representation in the cache can be a bit more complex, as filters can potentially be used by subscription rules that subscribe to many different message broker channels, even though the processing of a message can be limited to a single message broker channel. Therefore, a single CachedFilterSet object can be used to represent each filter in the cache. For each message broker channel that is associated with a filter via a subscription rule, then, a separate CachedFilter object can be created. Associations between filters and CachedRule/CachedChannel objects can be maintained using these channel-specific CachedFilter objects. Such an approach can help to restrict the scoping of associations to a single message broker channel, and can accelerate cache look-ups when processing messages.

Associations

The top-level Cache object can contain a hash-index to CachedRules, CachedChannels and CachedFilterSets, the index keys being rule name, channel name and filter name respectively. Each CachedRule object can contain a reference to its corresponding CachedChannel and CachedFilter. Each CachedChannel can contain an array of unfiltered CachedRule objects as well as an array of associated CachedFilter objects. The first array, unfilteredSubscribers, can allows a message broker to find all subscription rules that are subscribing to a particular message name and don't have an associated filter. This can include static and dynamic rules. A second array, applicableFilters, can allow the message broker to quickly determine the set of applicable filters for an incoming message based on those subscribers that do have an associated filter. Both sets of references can be determined at startup using information in a Subscription Rule table.

Each CachedFilter object can contain a reference back to the appropriate parent CachedFilterSet and to the assigned CachedChannel. There can also be two separate sets of CachedRule references: an array of subscription rules that have no associated filter value (null ValuedRules), and an index structure that maps specific filter values to one or more subscription rules (valuedRules). Depending on the number of filter values, this index structure can be a hash table or a simple array. These sets of references can be used to determine matching subscribers when a particular filter is satisfied by an incoming message. Both the valued and the null-valued sets of rules can include dynamic and static subscription rules.

Using the Cache

A more detailed view of an MB dispatch algorithm shows details on how a cache structure can be utilized. First, a message can be received with an assigned message broker channel All subscribers to the assigned channel that do not use a filter can be identified. In order to identify these subscribers, for instance, the Cache hash index can be probed for the relevant CachedChannel object, and the unfiltered SubscriptionRule objects can be collected from the CachedChannel unfilteredRules array. For subscribers with filters, subscription information can be used to determine the distinct set of all applicable filters based on the message channel. For instance, Filter objects can be collected from the CachedChannel applicableFilters array, and all applicable filters can be evaluated their filter values obtained. Using a message broker channel, the set of satisfied filters, and their filter values, the matching subscribers can be found and added to those already collected. In one approach, the relevant CachedFilter object can be obtained for each satisfied filter, such as by looking up the corresponding CachedFilterSet object by name and then walking the appropriate list of CachedFilters to find the one with the matching message broker channel. This walk can be very short, as filters may not be used across many different channels. If this is not the case, this list can be replaced with a hash table for large lists. SubscriptionRule objects can be obtained that do not have an associated filter value from each CachedFilter nullValuedRules array. Each CachedFilter valuedRules index structure can also be probed with the relevant filter value to get SubscriptionRule objects with matching filter values. For collected dynamic SubscriptionRule objects, a database query can be issued to get the dynamic subscriber instance information. This query can use the SubscriptionRule name and corresponding filter values. Retrieved instance strings can be combined with the SubscriptionRules ISubscriber objects to dispatch to specific dynamic subscribers. A message can be dispatched to each subscriber, such as by using an ISubscriber object from the triggered SubscriptionRules to dispatch the messages. For dynamic subscribers, retrieved instance information can be used along with the ISubscriber object to dispatch to specific dynamic subscribers. Subscriber dispatching can actually be done in the background as soon as subscribers are identified.

However, the system can still keep track of the subscribers to which the system has dispatched, such that no subscriber is sent the same message multiple times.

If no subscribers are found, a message can be sent to an error queue or a default subscriber. Part of the message broker configuration and management process can be to register a default subscriber. The default subscriber can be simply an ISubscriber object to which the Message Broker always has a reference. An error queue can be implemented as a JMS-based subscriber.

FIG. 6 shows some exemplary message broker-related Java classes and the associated methods. Some classes are only used internally by the message broker itself, while others can be used by "clients" of the message broker, including a message broker control.

Performance Tweaks

Some performance tweaks can be possible for layers such as the database and caching layers. One possible performance bottleneck is the index on the dynamic subscriber table. This index includes two VARCHAR-based keys: rule name and filter value. Maintaining and querying this index could become expensive, especially if large filter-value strings are common. This could be addressed by using an integer-based checksum computed from the filter value. This value would be an additional column in the dynamic subscriber table and would replace filter-value as the second-half of the index key. The filter value would still have to be stored, retrieved and verified for correct matches, but even a fairly cheap checksum would probably be sufficient to correctly identify matches without too many false positives.

Another tweak could involve adding an integer ID to each rule in the subscription rule table, and using that rule id to replace the rule name in the dynamic subscriber table. It may even be worthwhile to have a single checksum column based on both rule-name/id and filter value to avoid the complexities of multi-column index keys. This could be very important, since a single incoming message is likely to trigger multiple subscription rules, each with a different filter value. Representing each rule-name/filter-value pair with a single indexable value makes this a simple SQL IN query.

Subscriber Dispatching

Messages can be dispatched to subscribers in a subscriber-specific manner. A single transaction can be used by a message broker when dispatching messages. However, within the dispatch code of a particular subscriber type a separate transaction cab be used for isolation. There can be at least two types of subscribers, including JWS subscribers for web-services and workflows, and JMS subscribers.

Dispatching messages to JWS subscribers can involve generating a JWSRequest object, and scheduling it for delivery. For the most part, this can be handled through existing EJBs. To ensure transactional isolation from user code, messages can be dispatched asynchronously via an intermediate JMS queue. This can require the presence of an annotation such as @jws:message-buffer enabled="true" on any method used to receive message broker messages.

For JMS subscribers, messages can be enqueued using an existing message broker transaction. Consumers of that queue can dequeue the message in a separate transaction.

Data necessary to populate the Filter and Subscription Rule database tables can be collected at deployment time. This can be performed by a deployment tool, which can collect the data into a file and package it as part of the project's EAR file. When the EAR file is unpacked, this data can be registered with a message broker, such as by using a JMS interface. This process may work for JWS files, while non-JWS subscribers may need to use a similar tool to add subscription data to the EAR file, or may need to talk to the JMS interface directly.

User Model Overview

A message broker channel, or message-broker-channel, can have at least some similar properties to a JMS topic, but can optimized for use with business process management (BPM) services, for example.

A MessageBroker control can be a component/feature that is visible to users. Such a control can allow service (i.e., JWS or JWF) instances to publish messages to a message-broker-channel, as well as to dynamically register for and receive message-broker-channel messages. These are referred to herein as dynamic subscriptions.

Another such component/feature is an annotation. An annotation can allow a BPM service to be "started" to receive message-broker-channel messages. These will be referred to herein as static subscriptions. A JMS Connector can also be used that provides the ability to map a queued message to BPM services, using either a service URI or message-broker-channels. Further, message filters can be used for static subscriptions and MB control subscriptions to restrict the messages routed to a service. Message filters can be applied against message bodies or soap headers.

To use these components/services, a service can register to receive a message on a message-broker-channel with a static subscription using an annotation, or a dynamic subscription using the message broker control. A message can then be published to a message-broker-channel, using either the MessageBroker control or a JMS Connector. All services registered to receive the message can receive the message, subject to any filters they have set up.

Runtime Model Overview

In one embodiment, a message broker consists of JMS connectors that route incoming messages from foreign JMS queues. These connectors can be packaged as MDBs A message broker control can be utilized that allows services to publish and receive messages described at runtime. The broker can include a process that registers static subscribers at deployment time. Static and dynamic subscription tables can be used to hold the list of subscribers. The static tables can be in-memory and replicated on each node of a cluster. The dynamic tables can use a database management system (DBMS). A JMS connector and control can share common code, which can runs in the associated container.

Figure 7:
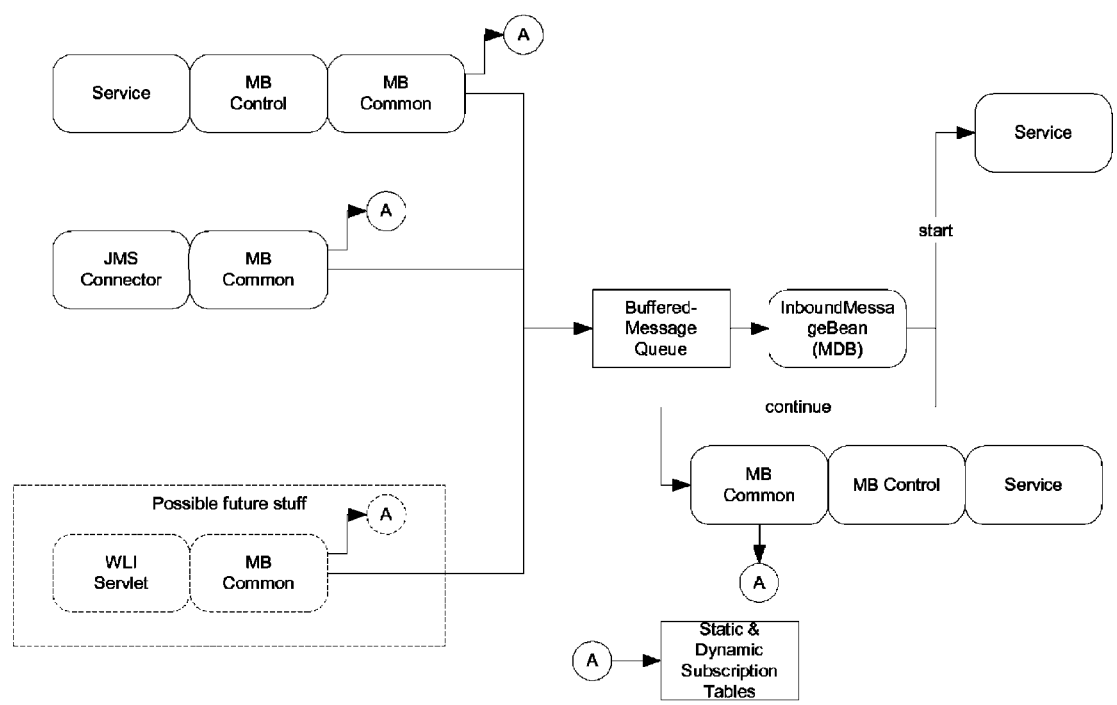
FIG. 7 is a diagram showing a logical call graph of the runtime that can be used in accordance with one embodiment of the present invention.

When a service statically subscribes to a message-broker-channel, at deployment time the registration process can call the MB common code that updates the subscription tables. When a service dynamically subscribes to a message at runtime, the MB control can call the MB common code that updates the subscription table. When a message is published, such as from a service or JMS connector, the MB common code figures out who should receive the message, based on the channel and filter information. For each subscriber, a message is enqueued in the appropriate buffered-message queue. FIG. 7 shows a logical call graph of the runtime. Paths from static subscribers to the static routing tables are not shown, since that happens only at deployment time.

MessageBroker Control

A message broker control can publish and receives messages using message-broker-channels. The control may not be able to be subclassed. A "subscribe" operation can be non-transactional, but can happen immediately, before a transaction commits. This can allow subscriptions to be set up prior to causing other non-transactional events that may send return messages. An example of an MB control is given in FIG. 8.

An example of how to use such an MB control is given by the following:

```
/*
* @wlw:control
* @comp:mb-static-data message-channel-name="pochannel"*
filter-body="message"
xquery::
*    $message/StockSymbol/text( )
* ::
*/
MessageBrokerControl myMbControl;
// publish a message
void sendIt(XML myMsgToSend) {
        myMBControl.publishXML("myChannel", myMsgToSend );
}
// subscribe to a message
void subscribeIt( ) {
        myMBControl.subscribeToFilteredChannels("BEA");
}
// receive a message after subscribing
myMbControl_onXMLMessage( XML myMsgReceived )
{
}
```

JMS Connector

A JMS connector can take incoming messages from a JMS queue or channel and can associate the message with a URI or message broker channel. If the message is associated with a URI, the message can be directly routed to the URI. For example, each message in a myapp.myqueue queue can be published to my.channel such as by the following:

```
<message-broker-jms-connector-def source-jndi-
    name="myapp.myqueue"> <router-def dest-value="my.channel"/>
</message-broker-jms-connector-def>
```

In a slightly more complex example, the connector listens to myapp.myqueue. If the JMS property "PRIORITY" is set to "YES" for a message, that message can be published to a priority service channel. Otherwise the message can be published to a "DEFAULT" service channel:

```
<message-broker-jms-connector-def source-jndi-
    name="myapp.myqueue"> <router-def match-jms-property-
    name="PRIORITY"
        match-jms-property-value="YES"/>
        dest-value="priority.channel"/>
    <router-def dest-value="default.channel"/>
</message-broker-jms-connector-def>
```

In a slightly more complex example, a connector, or event generator, can listen to myapp.myqueue. If the JMS property "CHANNEL" for a message is present, the message can be published to the channel name contained in the value of the "CHANNEL" property. All of the JMS properties can be included in the SOAP header. If the JMS property CHANNEL is not present, the message can be sent to a "DEFAULT" service URI:

```
<message-broker-jms-connector-def source-jndi-name="myapp.-
myqueue">   <router-def match-jms-property-name="CHANNEL"
```

-continued

```
        package-include-jms-props="yes"
        dest-value-source="jms-property"
        dest-value-type="message-broker-channel"
        dest-value="CHANNEL"/>
  <router dest-value-type="uri" dest-value="/my/default/service.jwf"/>
</message-broker-jms-connector-def>
```

JMS Topics

As discussed above, an example of a JMS control publish to a JMS binding for a queue is represented by the diagram of FIG. 1. This can be contrasted with FIG. 2, which represents what a JMS control publish looks like for a JMS Topic. The double queuing exists because the system cannot publish a topic directly to an entity bean (EB), but must go through an MDB. Since there are fewer MDBs than EBs, the MDBs have to push to multiple EBs. Further, the MDB cannot push to multiple EBs in a single transaction, as that would violate the isolation fundamental of the transaction. This is one reason for the second queue.

If a message-broker-channel is used instead of a JMS topic, the system can be optimized as shown in FIG. 3. Here, the MB control can publish directly to the asynchronous queues. The cost of doing the routing in the control is relatively small, and should not be a burden for the service.

Filters

Filters can be applied sequentially after a message-broker-channel match. Therefore, it is desirable in at least some embodiments to avoid multiple filters per message-broker-channel. Multiple filter-values for the same message-filter can be acceptable. Moreover, stateless workflows can be used to refine message-broker-channels if needed.

Figure 9:
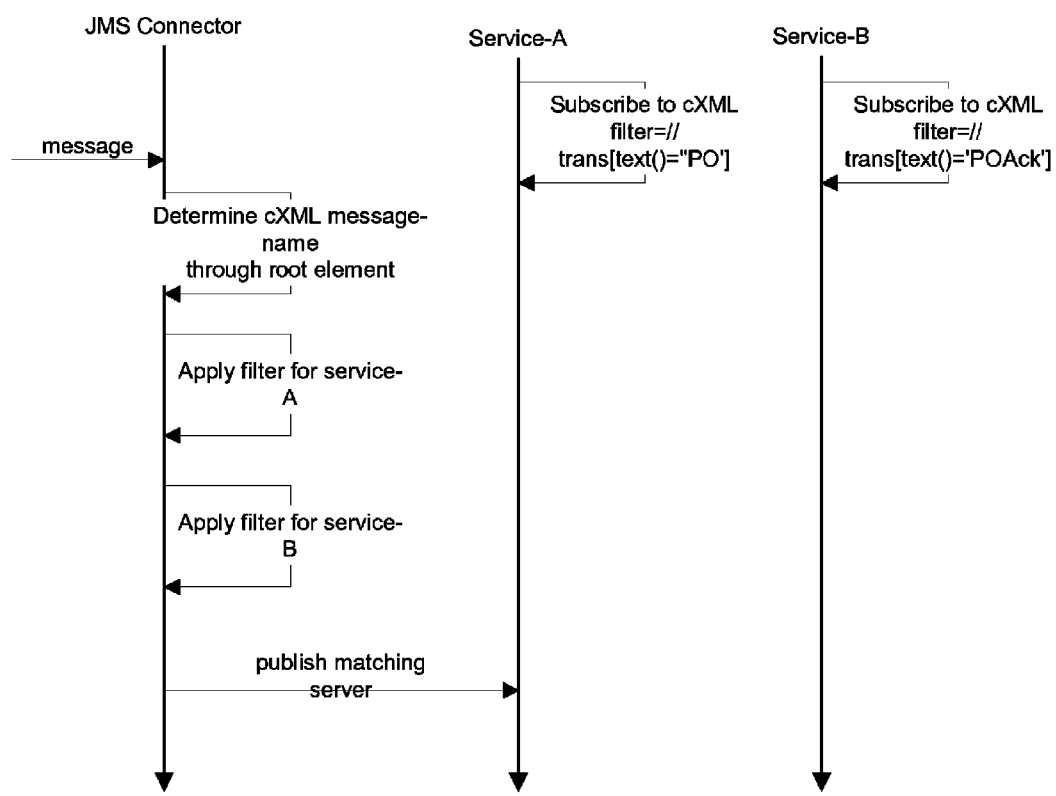
FIG. 9 is a diagram showing a filtering process that can be used with the system of FIG. 4.
Figure 10:
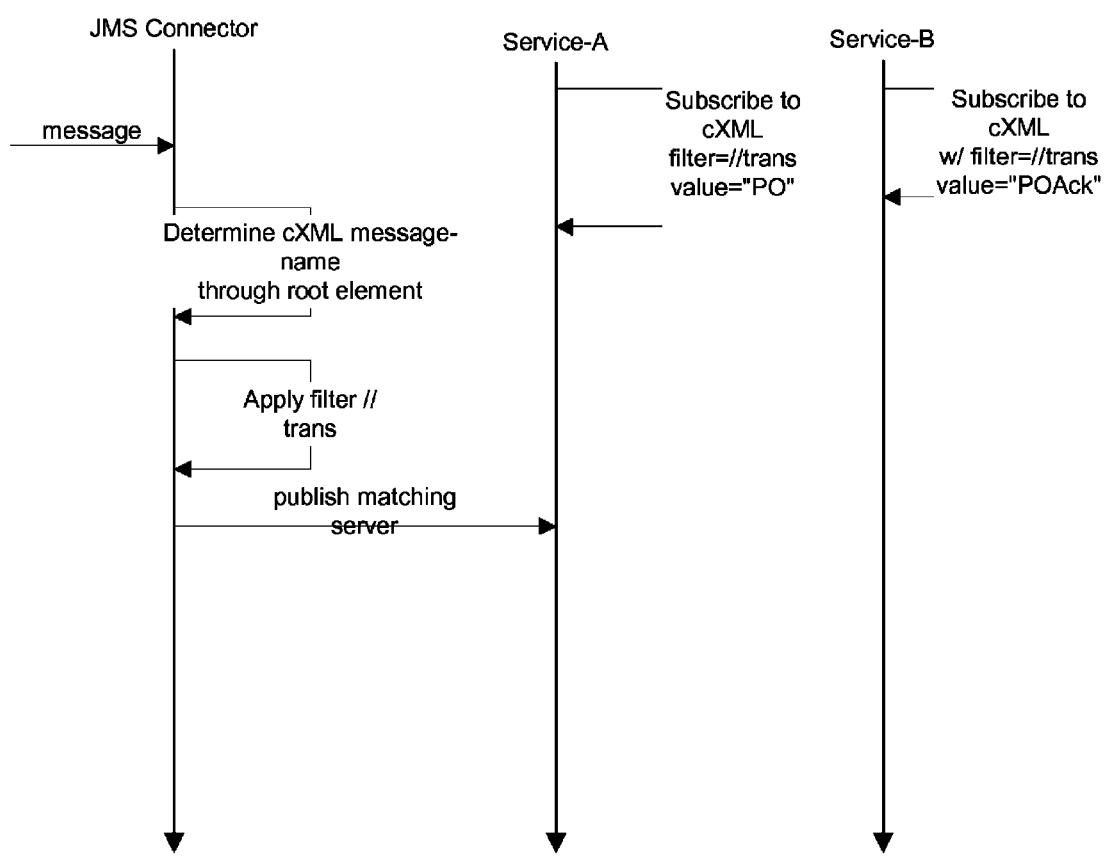
FIG. 10 is a diagram showing another filtering process that can be used with the system of FIG. 4.
Figure 11:
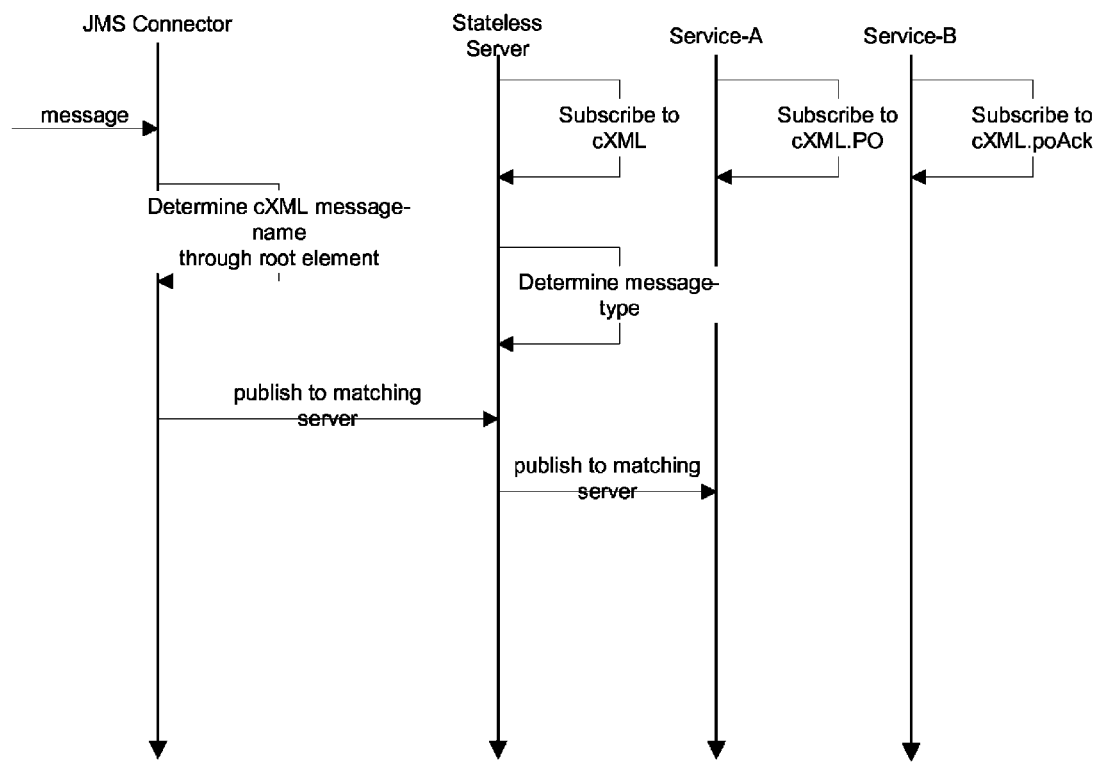
FIG. 11 is a diagram showing yet another filtering process that can be used with the system of FIG. 4.

In one scenario, an XML document has one DTD and one root element, but twelve transaction types. An inefficient way to handle this would be to have multiple servers subscribe to the same message channel, and use multiple filters against that one message channel. This is shown, for example, in FIG. 9. A more efficient approach would be to use the same filter with multiple values, as shown in FIG. 10. Another efficient approach is to have servers subscribed to refined message-broker-channels, and have a stateless server refine the message-broker-channel, as shown in FIG. 11. This can be done with a single XQuery.

Whenever a dynamic subscription is used, a database access is used to check for the presence of a subscribed service. The database access can be used even if there are no subscribers, as there may be no way to tell this in advance. To minimize such access, it can be better to dynamically subscribe to a refined message-broker-channel.

Figure 12:
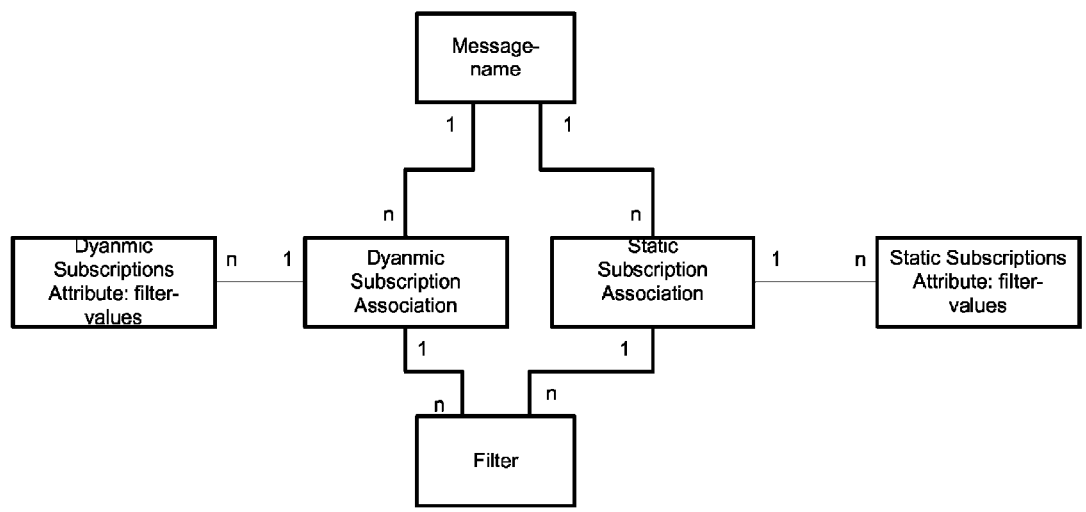
FIG. 12 is an exemplary logic ER diagram of message broker data.

An exemplary logic ER diagram of MB data is shown in FIG. 12. In this example, subscriptions are always scoped to message-broker-channels. Filters are associated with subscriptions and may be shared between subscriptions, and the filters must be named to do this. Everything can be cached except for dynamic subscriptions, and caching is done at service deployment time. A separate table associates messages-channels, filters and dynamic subscriptions. For dynamic subscriptions, then, it is possible to check whether a dynamic filter-value access is needed (i.e., whether it has a filter) before attempting to get one.

Example Use Case

Figure 13:
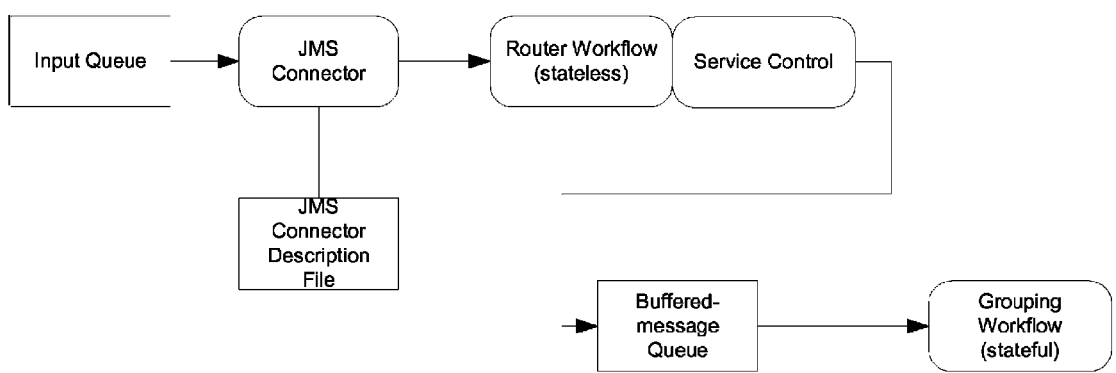
FIG. 13 is a diagram showing an exemplary runtime component system.

In an exemplary use case, a company wants to order unordered messages, but they have sequence numbers. Once the messages are ordered in a digest, they are processed as a batch operation. If the messages take too long, a timeout is declared and a manual intervention fixes them up. A diagram of the runtime components is shown in FIG. 13. The JMS Connector Description File looks as follows:

```
  <message-broker-jms-connector-def source-jndi-name="myapp.-
          myqueue"> <router-def dest-value="/router-workflow"/>
  </message-broker-jms-connector-def>
```

The Routing Workflow looks as shown in FIG. 14, and, the Subscriber Workflow looks as shown in FIG. 15.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system for filtering messages between servers on a message channel, comprising:
   a message broker component that enables the servers to publish messages to a message channel and to subscribe to receiving messages on said message channel; the message broker associated with a cache memory and a database to determine routing,
   wherein the message broker checks whether the servers are capable of registering for a dynamic subscription to the message channel, wherein the dynamic subscription can change at runtime, and wherein if the servers are capable of registering for said dynamic subscription, the message broker accesses the database to get subscription information, otherwise if the servers are not capable of registering for said dynamic subscription, the message broker accesses the cache memory to get the subscription information.

2. The system of claim 1, wherein the subscription information includes message filters.

3. The system of claim 1, wherein message filters are compared with an extract from the message to determine whether to send the message to a server.

4. The system of claim 3, further comprising a query component on each server, each query component adapted to extract data from a message to be published, whereby the extracted data is compared with the filter value in order to determine whether to send a subscriber the message.

5. The system of claim 4, wherein the query component is an XML query component.

6. A system according to claim 1, wherein:
   the message broker component is further adapted to allow subscribers to subscribe to the message channel.

7. A system according to claim 1, further comprising:
   a message queue adapted to receive messages on the message channel.

8. A computer readable storage medium having a set of instructions stored thereon, which when executed by one or more processors, cause said one or more processors to implement:

a message broker component that enables the servers to publish messages to a message channel and to subscribe to receiving messages on said message channel; the message broker associated with a cache memory and a database to determine routing, wherein the message broker checks whether the servers are capable of registering for a dynamic subscription to the message channel, wherein the dynamic subscription can change at runtime, and wherein if the servers are capable of registering for said dynamic subscription, the message broker accesses the database to get subscription information, otherwise if the servers are not capable of registering for said dynamic subscription, the message broker accesses the cache memory to get the subscription information.

9. The computer readable storage medium of claim 8, wherein the subscription information includes message filters for the servers.

10. The computer readable storage medium of claim 8, wherein message filters are compared with an extract from the message to determine whether to send the message to a server.

11. The computer readable storage medium of claim 10, further comprising a query component on each server, each query component adapted to extract data from a message to be published, whereby the extracted data is compared with the filter value in order to determine whether to send a subscriber the message.

12. The computer readable storage medium of claim 11, wherein the query component is an XML query component.

13. A computer readable storage medium according to claim 8, wherein:

the message broker component is further adapted to allow subscribers to subscribe to the message channel.

14. A computer readable storage medium according to claim 8, further comprising:

a message queue adapted to receive messages on the message channel.

* * * * *